No. 737,100. PATENTED AUG. 25, 1903.
C. F. HAMLIN.
GRASS RECEPTACLE FOR LAWN MOWERS.
APPLICATION FILED JULY 1, 1901.
NO MODEL.
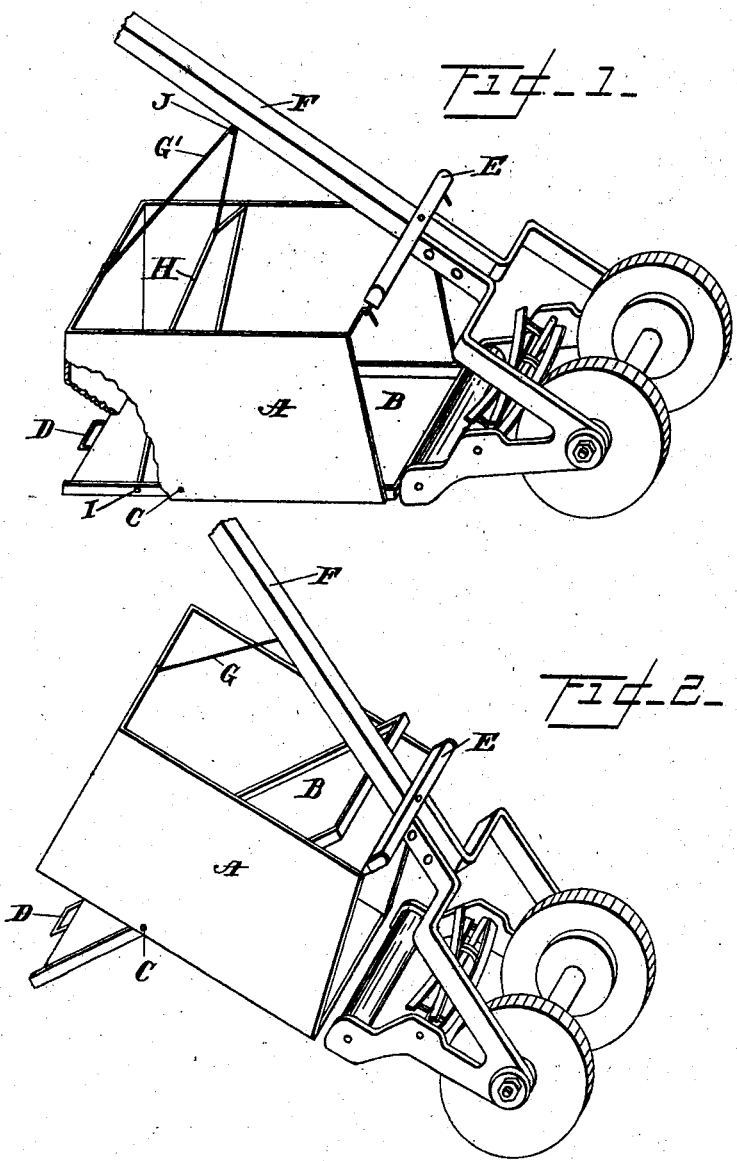
WITNESSES
Chas L. Hyde.
Mattie McGinnis.
INVENTOR
Charles F. Hamlin
BY HIS ATTORNEYS
Hazard & Harpham.

No. 737,100. Patented August 25, 1903.

UNITED STATES PATENT OFFICE.

CHARLES F. HAMLIN, OF PASADENA, CALIFORNIA.

GRASS-RECEPTACLE FOR LAWN-MOWERS.

SPECIFICATION forming part of Letters Patent No. 737,100, dated August 25, 1903.

Application filed July 1, 1901. Serial No. 66,793. (No model.)

*To all whom it may concern:*

Be it known that I, CHARLES F. HAMLIN, a citizen of the United States, residing at Pasadena, in the county of Los Angeles and State of California, have invented new and useful Improvements in Grass - Receptacles for Lawn - Mowers, of which the following is a specification.

My invention relates to means to catch the grass as it is thrown from the knives of a lawn-mower while in operation; and the object thereof is to prevent the grass from falling into the stubble after being cut. The grass being short is with great difficulty raked from the lawn after being cut, and to provide handy means to remove the cut grass from the grass catcher or receptacle at certain places on the lawn. I accomplish these objects by means of the device herein described, and shown in the accompanying drawings, in which—

Figure 1 is a perspective view of a lawn-mower having attached thereto a grass-catcher embodying my invention, the bottom being in its closed position. Fig. 2 is a similar view of my device attached to a lawn-mower with a slight modification, the bottom being open in position to discharge whatever grass may be therein.

In the drawings, A represents the grass-receptacle, comprising a rectangular box, preferably made of sheet-iron, having a tilting bottom B, pivoted in the bottom of the receptacle by means of pivots C, projecting therefrom and passing through the sides of the receptacle. This bottom is pivoted toward the rear end of the receptacle, so that the bottom will stay normally closed. The bulk of the load being thrown in front of the pivot will depress the front end, which will keep it closed. I secure the receptacle to the mower by providing a cross - bar E, secured to the handle F, near the knives of the mower. To each end of this cross - bar I secure a front corner of the receptacle by a flexible joint, which prevents the front end of the receptacle from dropping too far downward, the rear end of the receptacle being connected to the handle by any flexible connection, such as the cord G. The rear end of the bottom projects under the rear or end wall of the receptacle, which prevents the forward end of the bottom from dropping too far.

When it is desired to unload the grass from the receptacle, the foot of the operator is placed on the foot projection D on the rear end of the tilting bottom and that end of the bottom will be thrown down into the position shown in Fig. 2, when the contents will be deposited on the ground. When the grass has been dumped from the tilting bottom, the foot is removed from the foot projection, when the bottom will immediately close—that is, assume the position shown in Fig. 1—and the receptacle is ready for a new load.

In Fig. 1 I have shown the bottom provided with a bail H, which is pivotally connected to the bottom at I intermediate the rear end and the pivot which connects the bottom to the sides. To this bail is attached a flexible connection G', which is preferably a cord, which runs up to and through a fixture J, affixed to the handle, preferably a screw-eye in the handle, a little in front of a perpendicular line extending from the handle to the rear end of the receptacle, thence down to and affixed to the center of the rear end of the receptacle. By this construction when the foot is placed on the foot-piece D and the handle raised the end of the receptacle is brought toward the handle, while the bottom tilts on the pivot, and when the foot is removed the parts resume their normal position. In Fig. 2, which is a modification of Fig. 1, I have shown the bottom without the bail, the weight of the forward portion of the bottom being sufficient to keep the bottom normally closed.

Having described my invention, what I claim as new, and desire to secure by Letters Patent, is—

1. An attachment for lawn - mowers comprising a grass-receiving receptacle open at the front and having a closure at the rear and having a tilting bottom pivoted to the sides thereof by pivots which enter the bottom at a point in said bottom intermediate the center and the rear end thereof.

2. The herein-described receptacle for attachment to lawn-mowers, comprising a rectangular box open at the front end, and provided with a tilting bottom pivoted to the sides intermediate the center and rear end of said bottom; a foot projection attached to the rear end of said bottom extending rearwardly of the rear wall of the receptacle.

3. A receptacle for attachment to lawn-mowers, having two sides and a rear end, open at the top and front end; a tilting bottom pivoted to said sides intermediate the center of the receptacle and the rear end thereof and provided with a projecting lug to engage the foot; and means to attach the receptacle to the mower, substantially as shown and described.

4. A grass-catching attachment for lawn-mowers, comprising a receptacle having two sides, an end and a bottom; said sides being flexibly connected to a cross-bar on the handle of the mower; said bottom having a foot-receiving projection extending rearwardly of the end of the receptacle and being pivoted to the sides; a bail attached to said bottom intermediate the pivot and rear end thereof; a flexible connection affixed at one end to the bail, thence passing up through a fixture on the handle and down to and affixed to the rear end of the receptacle, in combination with a lawn-mower having a handle; a cross-bar on said handle adjacent to the knives of the mower; and a fixture on said handle adapted to permit of a sliding movement therethrough of the flexible connection which unites the bail of the bottom to the rear end of the receptacle.

5. In a lawn-mower the combination of a receptacle having sides and a rear end; a tilting bottom pivoted in said sides intermediate the rear end and center of said bottom and having a foot extension at the rear end; a cross-bar on the handle of the mower to support the front end of the receptacle; a flexible support to secure the front end of the sides to the cross-bar; a flexible connection between the handle and the rear end of the receptacle, substantially as shown and described.

6. A grass-catching attachment for lawn-mowers comprising a grass-receiving receptacle having a tilting bottom pivoted to the sides thereof; a bail attached to said bottom intermediate the pivot and the rear end thereof; a flexible connection affixed at one end to said bail, thence passing up through a fixture on the handle of the mower and down to and affixed to the rear end of the receptacle; means to attach the front end of said receptacle to the mower; in combination with a lawn-mower having a handle.

In witness that I claim the foregoing I have hereunto subscribed my name this 24th day of June, 1901.

CHARLES F. HAMLIN.

Witnesses:
G. E. HARPHAM,
MATTIE McGINNIS.